Figure 1:
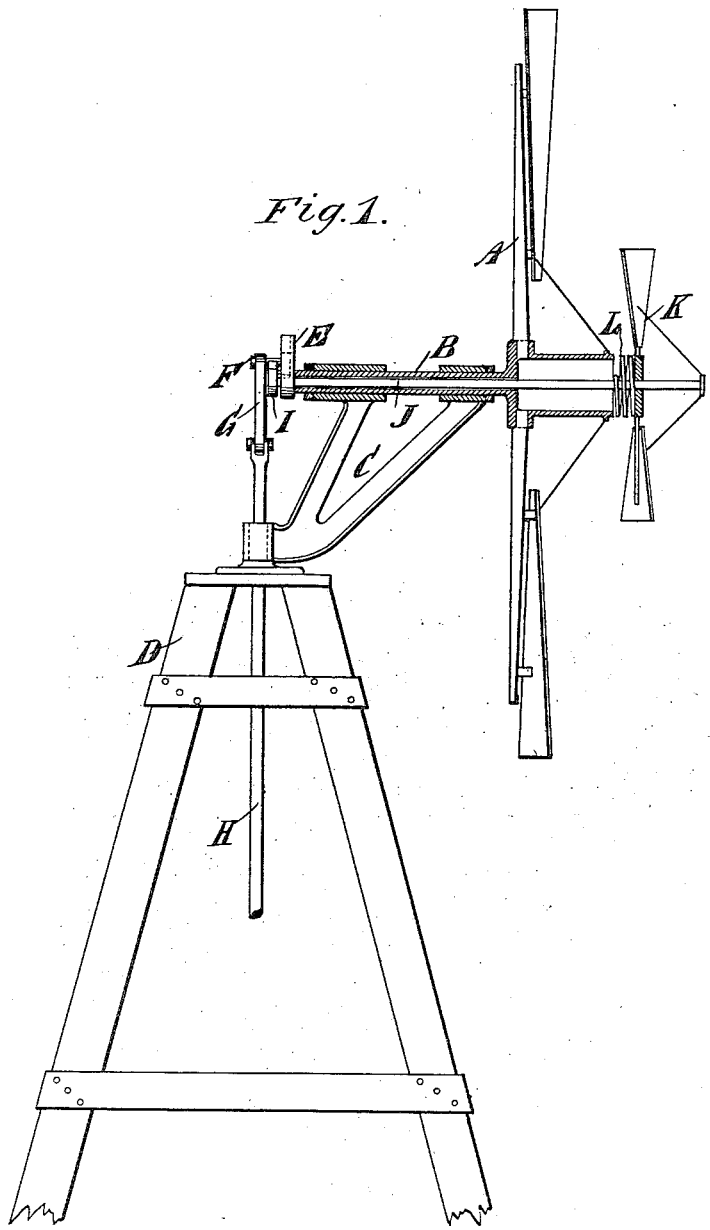

(No Model.) 2 Sheets—Sheet 1.

W. C. HOFFNER.
POWER TRANSMITTING GEAR FOR WINDMILLS.

No. 569,458. Patented Oct. 13, 1896.

WITNESSES:
J. B. Walker
Rev. G. Hosted

INVENTORS
W. C. Hoffner
BY
ATTORNEYS (No Model.) 2 Sheets—Sheet 2.
W. C. HOFFNER.
POWER TRANSMITTING GEAR FOR WINDMILLS.
No. 569,458. Patented Oct. 13, 1896.
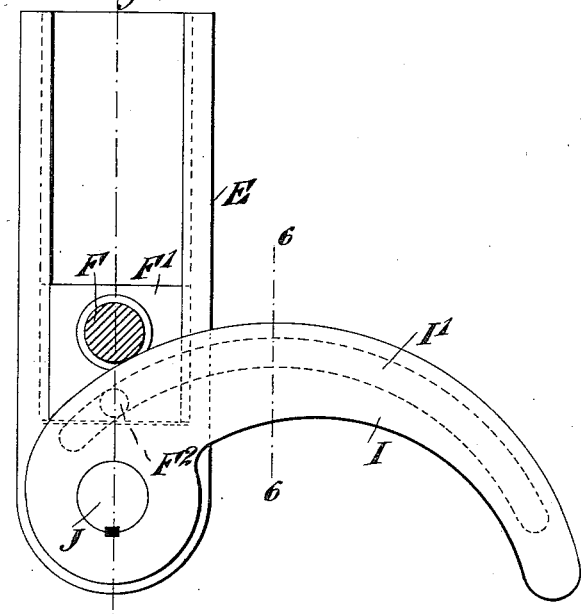
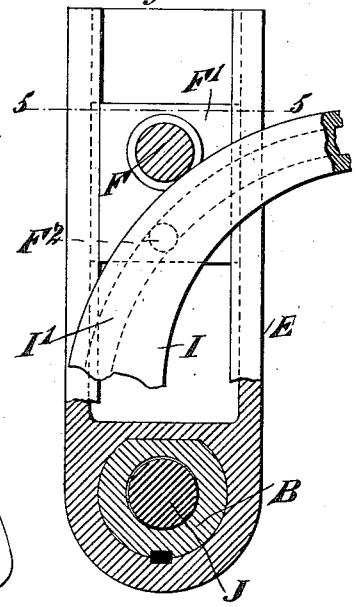
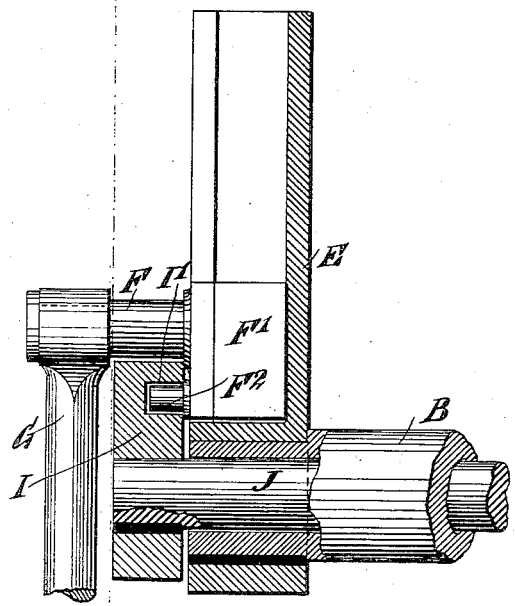
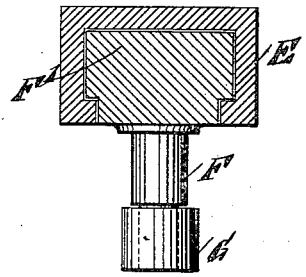
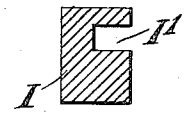
WITNESSES:
INVENTORS
W. C. Hoffner
BY
ATTORNEYS

UNITED STATES PATENT OFFICE.

WILLIAM C. HOFFNER, OF PROSPECT PARK, CALIFORNIA.

POWER-TRANSMITTING GEAR FOR WINDMILLS.

SPECIFICATION forming part of Letters Patent No. 569,458, dated October 13, 1896.

Application filed January 4, 1896. Serial No. 574,303. (No model.)

*To all whom it may concern:*

Be it known that I, WILLIAM C. HOFFNER, of Prospect Park, in the county of Los Angeles and State of California, have invented a new and Improved Power-Transmitting Gear for Windmills, of which the following is a full, clear, and exact description.

The object of the invention is to provide a new and improved transmitting-gear for windmills which is simple and durable in construction, very effective in operation, arranged to regulate the length of the stroke according to the force of the wind, and to transmit the power of the wind-wheel to a pump or other machinery without much friction of the working parts.

The invention consists principally of a crank-arm having a slidable wrist-pin controlled from an auxiliary wind-wheel.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement as applied. Fig. 2 is an enlarged sectional front view of part of the improvement on the line 2 2 of Fig. 4. Fig. 3 is a similar view of the same with parts in a different position. Fig. 4 is a sectional side elevation of the same on the line 4 4 of Fig. 2. Fig. 5 is a sectional plan view of the same on the line 5 5 of Fig. 3, and Fig. 6 is a cross-section of the cam for moving the slidable wrist-pin.

The wind-wheel A, of any approved construction, is provided with a hollow shaft B, journaled in suitable bearings on the wind-wheel frame C, mounted to turn on the upper end of the tower D in the usual manner. On the front end of the shaft B is secured a crank-arm E, in which is fitted to slide a block F', carrying a wrist-pin F, engaged by a pitman G, connected with the upper end of the pump-rod H, as is plainly illustrated in Fig. 1. The position of the slidable block F' and the wrist-pin F changes according to the power of the wind, so as to increase or decrease the stroke given to the pump-rod H, it being understood that in a light wind the stroke is considerably less than during a heavy wind, and consequently during a light wind less power is necessary for actuating the pump-rod, as the stroke thereof is shortened correspondingly; but during a strong wind a full stroke is given to the pump-rod H.

Now in order to regulate the position of the block F', I provide said block with a pin $F^2$, located below the wrist-pin F and projecting into a cam-groove I', formed in a cam I, secured on a shaft J, mounted in the hollow shaft B and carrying a small wind-wheel K behind the main wind-wheel A. A spring L is interposed between the hub of the auxiliary wind-wheel K and the hub of the wind-wheel A; but this spring must be sufficiently strong to offset the power of the wind on the wind-wheel K in an ordinary breeze and is provided with a ratchet to regulate its tension.

Now it will be seen that when the windmill is in operation and a light wind is blowing then the wrist-pin F remains in an innermost position, as indicated in Figs. 2 and 4, but when the wind increases in force then the auxiliary wind-wheel K rotates faster than the wind-wheel A, and consequently the cam I creeps up to the crank-arm E, so that the block F' is shifted outwardly in the crank-arm and the stroke of the pump-rod H is thus increased. If the wind diminishes in force, then the spring L drives the wind-wheel K back and the cam I acts on the pin $F^2$, so as to draw the block F' inwardly to decrease the stroke correspondingly.

Thus it will be seen that by the arrangement described the stroke is regulated automatically according to the force of the wind, and the power of the windmill is transmitted to the pump or other machinery without much friction of the working parts.

Having thus fully described my invention, I claim as new and desire to secure by Letters Patent—

1. The combination with a support, of a windmill, a crank-arm moving with the windmill, a block slidable longitudinally with the crank-arm, a rod connected to the block, a cam capable of actuating the block in its sliding movement, and an auxiliary wind-wheel controlling the cam, substantially as described.

2. The combination with a support, of a wind-wheel, a crank moving with the wind-wheel, a block slidable longitudinally with the crank, a rod connected to the block, a cam controlling the block in its sliding movement, an auxiliary wind-wheel, and a spring connected to the auxiliary wind-wheel and capable of regulating its movements, substantially as described.

3. The combination with a support, of a crank-arm, a part on which said crank-arm is mounted a block slidable on the crank-arm, a rod connected to the block, a cam capable of controlling the block in its sliding movement, and means for operating the cam, substantially as described.

4. The combination with a support, of a crank-arm having a groove, a part on which said crank-arm is mounted a block slidable in said groove, a rod connected to the block and having a pin, a grooved cam receiving the pin in the groove of the cam, and means for actuating the cam, substantially as described.

5. The combination with a support, of a hollow shaft, a wind-wheel fixed on said hollow shaft, a crank-arm carried by the hollow shaft, a block slidable longitudinally on the crank-arm, a rod connected to the block, a solid shaft rotatable within the hollow shaft, a cam connected to the solid shaft and actuating the block in its sliding movement, an auxiliary wind-wheel connected to the solid shaft, and a spring actuating the auxiliary wind-wheel, substantially as described.

6. The combination with a support, of a revoluble shaft, a crank-arm, a block slidable longitudinally on the crank-arm, a member pivotally connected to the block, and means for controlling the position of the block on the crank-arm, substantially as described.

WILLIAM C. HOFFNER.

Witnesses:
ARTHUR RICHARDSON,
S. W. COVE.